June 15, 1948.   J. J. TAYLOR   2,443,435
INSULATOR

Filed June 23, 1945   2 Sheets-Sheet 1

Inventor
JOHN J. TAYLOR

By
Gordon C. Mack
Attorney

Patented June 15, 1948

2,443,435

UNITED STATES PATENT OFFICE 2,443,435

INSULATOR

John J. Taylor, Wadsworth, Ohio, assignor to The Ohio Brass Company, Mansfield, Ohio, a corporation of New Jersey Application June 23, 1945, Serial No. 601,248

21 Claims. (Cl. 174—196)

This invention relates to line insulators and particularly insulators of the suspension type although useful in connection with other types of insulators. The invention has for its object the provision of means to prevent the cracking of the vitreous portion of the insulator due to the oxidation of metallic elements forming parts of the insulator.

The invention is exemplified in the combination and arrangement of the parts shown in the accompanying drawings and described in the following specification, and it is more particularly pointed out in the appended claims.

In the drawings—

Line insulators, not infrequently, are composed of one or more porcelain or other vitreous elements associated with one or more metallic elements, particularly in the case of suspension type insulators.

The metal parts are usually of iron which is galvanized to protect it from corrosion and in some cases attempts are made to protect the galvanizing coating by a thin coating thereon of wax, varnish or a similar material.

Figure 1:
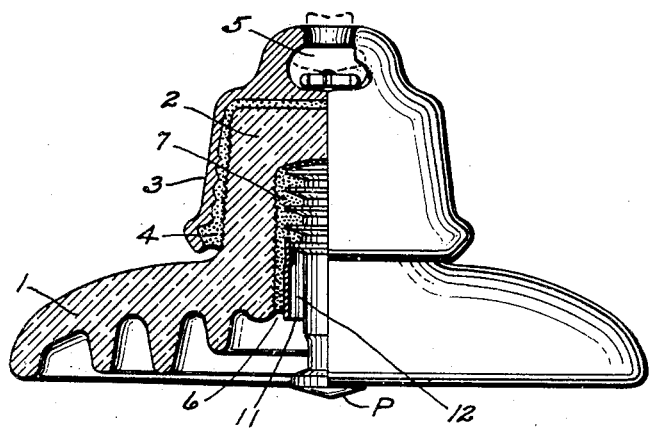
Fig. 1 is a side view of one form of my invention, in partial section.

In the suspension type of insulator in which a vitreous disc such as shown in Fig. 1 is provided with a metal cap and pin, in which the metal parts are secured to the disc by interposed cement, the pressure exerted by the corroding pin upon the interposed cement due to the oxidation of the pin is severe enough to crack the disc.

Pin corrosion is to be expected in certain unfavorable geographic areas no matter what commercial metal is used in the pin. Pins have been made of stainless steel, copper base alloys and steel with a variety of protective coatings, but it has been found all of these are liable to attack by the combined destructive ability of moisture, leakage current, temperature and the active oxidizing conditions brought about by electrical overstress in a confined area.

Metal parts of conventional types of insulators when made of bronze will corrode, but such corrosion produces a soft and relatively thin coating as compared with that of a pin of ferrous metal and the danger of damaged discs is therefore much less. However under present conditions one is limited as to available metals and from the standpoint of cost the use of bronze is justified only in exceptional cases.

An insulator of the type referred to above is shown in the U. S. Patent 947,274 of January 25, 1910. The pin in this type of construction in due course of time begins to oxidize or rust at the lower edge of the cement and this rust eats its way upward along the pin and in the case of an iron pin, either plain or galvanized, the coating of rust swells or grows, thus increasing materially the diameter of the pin and in time the pressure exerted on the disc through the interposed cement causes the vitreous disc to rupture and the cement to chip away.

It is the purpose of my invention, not so much to prevent corrosion of the pin by the exclusion of moisture, but to provide means whereby the accumulation or growth of the coating of rust will not bring excessive pressure upon the cement and vitreous disc.

In Fig. 1 is shown an insulator in partial section in which is incorporated means for preventing pressure upon the cement and disc and still retain the benefit of a conductor extending as far as the lower edge of the opening in the disc.

In Fig. 1, the disc 1 is formed from a vitreous insulating material such as porcelain or glass and has the head 2 enclosed in a metal cap 3 which is secured to the head by the interposed cement 4, and has the socket 5 to receive supporting means.

The head 2 is provided with the hole or cavity 6 in which is positioned the pin P embedded in cement 7. To secure a proper hold of the cement to the outer and inner surfaces of the head, the same is usually prepared with a sanded surface and the cement usually used is quite near Portland cement which is inclined to develop radial weaknesses due to drying shrinkage.

The pin P comprises a central shank 8 from which project a plurality of integrally formed annular flanges 9 whereby a firm interlock is secured with the cement 7. At the lower end of the shank 8 is a knob 10 which will interfit with the socket 5 on a like insulator positioned below.

The flanges 9 may be such that they will practically resist all yielding of the pin under an axial load or they may be sufficiently thin to permit a slight yielding of the pin relative to the cement under sufficient loading.

To prevent such destructive corrosion as will develop along the pin shank above the inner edge of the conventional type of insulator shown in the above patent, the pin includes a shell, sleeve or collar 11 which is secured to one of the flanges 9, preferably the lower flange.

One purpose of this shell or sleeve 11 is to provide an open space 12 around the pin shank which is usually in contact with the cement.

Another purpose of the sleeve 11 is to retain the interposed cement as would be the case if it filled the entire space between the pin shank and disc. To prevent undue pressure upon the disc and the cement between the shell and disc, certain features are incorporated in the sleeve.

Figure 3:
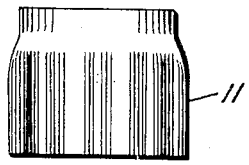
Fig. 3 is a side view of the shell in Fig. 2.

The sleeve 11 is formed preferably from a tube of proper length and material and by means of dies formed into the shape shown in Fig. 3 and this formed sleeve is then positioned on a flange 9 and then the entire assembly is hot dip galvanized. This places a protective coat over the entire surface of the pin including the shell and not only integrally secures the sleeve to the flange but forms a sealed joint therebetween as though welded.

Figures 4, 5:
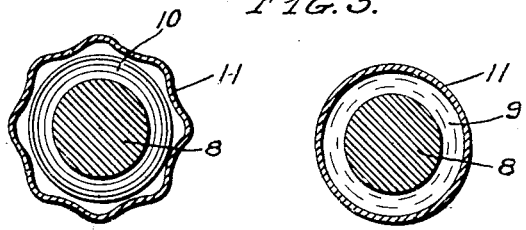
Fig. 4 is a section on the line 4—4 of Fig. 2.
Fig. 5 is a section on the line 5—5 of Fig. 2.

Since the stress set up by the products of corrosion is radial, I find that in order to give proper radial flexibility to the sleeve 11, it should be corrugated vertically or in an axial direction as shown in Figs. 3 and 4. Such corrugations have been found to contribute in a very decided degree, to the radial flexibility of sleeve 11 and provide a sleeve of an entirely different order of radial rigidity from that of a plain cylindrical or uncorrugated sleeve or from a sleeve having annular or ring corrugations, even though the latter types are made of material of impractically thin section.

Figure 6:
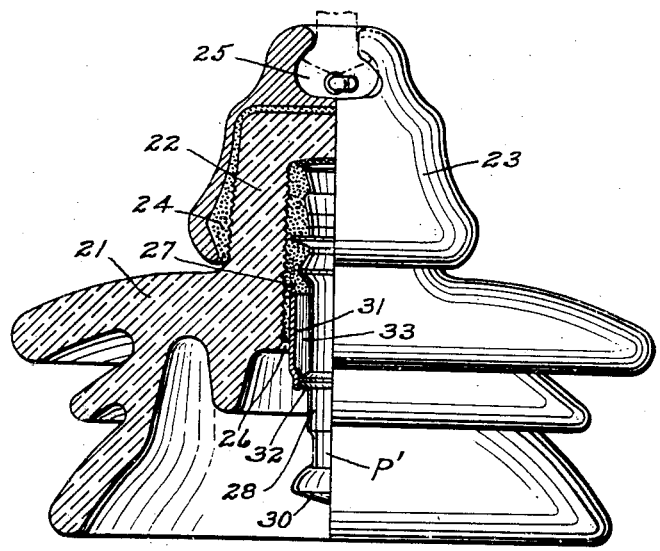
Fig. 6 is a side view of another form of my invention, in partial section.

An insulator of the type shown in Figs. 1 and 6 may be subjected to vertical loads of from 15,000 to 25,000 pounds or more. This invariably calls for some relative vertical yielding of the parts, which however is very slight. The tendency is for the pin to yield to a greater degree relative to the disc than the cap yields relative to the disc.

Any annular or ring corrugations on the sleeve 11 will interlock with the cement and if the sleeve is interlocked with the pin also there will be danger of the cement and discs 1 and 21 being checked and broken in time. Also the annular or ring corrugations tend to stiffen the sleeve in a radial direction thus destroying its radial flexibility and ability to yield under the products of corrosion.

Further, vertical or axial corrugations, while they interlock with the cement, do not resist the pin yielding under load or for other reasons and therefore do not stress the cement and disc and since they tend to increase the radial flexibility of the sleeve, the danger of injury to the cement and disc is very remote. The sleeves 11 and 31 do not take any of the vertical load upon the pin.

In the construction of the sleeve shown in Figs. 3 and 4, the vertical corrugations do not extend throughout the length of the sleeve 11 but blend into a cylindrical section at the line of juncture between the flange 9 and sleeve 11. Better performance would be expected of a construction in which the corrugations extended the full length of the sleeve, but in such a construction and to permit hot-dip galvanizing of the entire assembly, the mating surface on the pin would require corresponding fluting.

If the sleeve is made of cold drawn seamless tubing, corrosion will, in the course of time, set in starting at the lower edge of the sleeve and gradually creeping upward along the sleeve next to the cement. This will naturally cause a pressure to be exerted upon the porcelain through the interposed cement as a result of the resistance of the sleeve 11.

This resistance may be considerable as corrosion builds up unless the sleeve is properly designed with respect to the ultimate resistance of the disc 1 to splitting.

Figure 2:
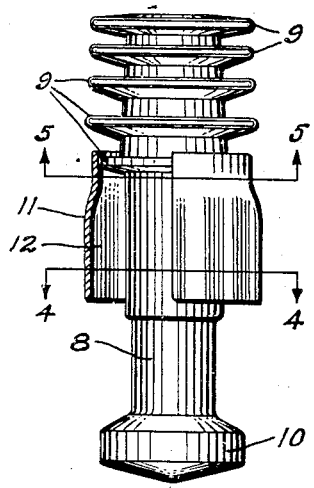
Fig. 2 is an enlarged side view in partial section of the pin shown in Fig. 1.

It has been found in a certain insulator construction of the type of Fig. 1 that a pin according to Fig. 2 using a sleeve according to Figs. 3 and 4 made of cold drawn seamless steel tubing of 0.032" metal and corrugated to control its radial resistance and with an assumed 0.01" coating of corrosion products will develop pressures in the order of 1000 pounds per square inch and other tests have shown that a radial pressure of about 5000 pounds per square inch necessary to split the disc of the construction shown.

A steel sleeve is preferably used as it is easily formed, is elastic and readily galvanized and under war restrictions it is less difficult to procure than non-ferrous materials.

Figure 7:
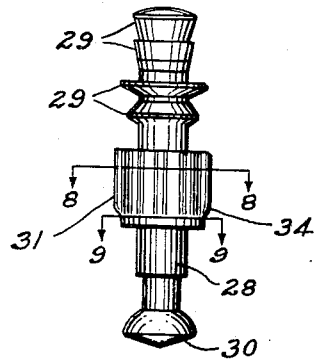
Fig. 7 is a full side view of the pin shown in Fig. 6.
Figure 8:
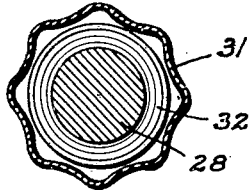
Fig. 8 is an enlarged section on the line 8—8 of Fig. 7.
Figure 9:
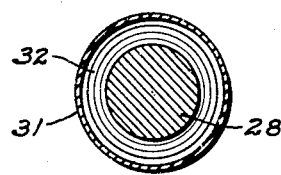
Fig. 9 is an enlarged section on the line 9—9 of Fig. 7.

In Fig. 6 is shown a somewhat different construction of insulator but in which the same principle is involved as in Fig. 1 but the type of pin shown in Fig. 7 may be adopted for use in the disc shown in Fig. 1.

In Fig. 6, there is a vitreous disc 21 provided with a head 22 and cap 23 secured to the head by interposed cement 24, the surface of the head being sanded. The cap also has a pin P' positioned in the socket 26. The pin is embedded in cement 27 which is secured to the disc by a sanded surface. The cement used is usually a Portland cement which has the weakness previously stated.

The pin P' comprises a central shank 28 from which project several annular flanges 29 whereby a secure interlock is formed with the cement 27. The pin has at its lower end a knob 30 which will interfit with the socket 25 on an insulator positioned below.

To prevent the destructive corrosion along the pin shank opposite the lower portion of the cement 27 from injuring the cement and disc, the pin shank is provided with a shell or sleeve 31 which is secured to a flange 32.

This sleeve 31 is inverted but forms a space 33 around the pin shank which may be entirely enclosed or ventilated as by a small opening 34 through either the sleeve 31 or flange 32.

The sleeve 31 is vertically corrugated as is the sleeve 11 and for the same purpose and reasons and the free corrugated portion extends well into the cement 27. The lower portion of the sleeve 31 is placed in position on its flange 32 and the entire assembly is then hot-dip galvanized.

Under some circumstances the air trapped in the closed space 33 as the pin in its inverted position is inserted into the soft cement at the time of assembly, may prevent cement entering the space 33, but if it is desired to keep the space 33 absolutely clear of cement the space may be filled or protected from filling with a resilient compound or material which will not affect the yielding properties of the sleeve 31.

The sleeve 31 will perform similar to the sleeve 11 of Fig. 1 under corrosive action as it occupies the same relative position as sleeve 11. The opening 34 will tend to ventilate the space 33 thereby preventing moisture being drawn in between the sleeve and cement due to changes in volume of entrapped air.

Under some conditions the sleeve may be a plain cylinder of uniform diameter throughout its length and it is from such a cylinder the vertically corrugated sleeves 11 and 31 are made by suitable forming dies. Such a plain cylindrical sleeve may be provided with a plurality of narrow vertical slots or perforations to control the said resistance.

The sleeves 11 and 31 are each securely attached to its respective pin both mechanically and electrically since the parts are galvanized after assembly.

By knowing the minimum value at which the vitreous disc will break, which will vary in different constructions and then harmonizing the material, construction and relation of the sleeve and pin accordingly and allowing for a sufficient factor of safety the danger of injury to the disc as a result of forces exerted by the products of corrosion may be not only practically eliminated but the life of the insulator materially prolonged.

While Figs. 1 and 6 show my improved type of pin as applied to insulators of the suspension type, it may be applied to other types of commonly used insulators on the market where the same problems are present.

While I have shown and described preferred embodiments of the invention, I reserve the right to make such changes in form, construction and arrangement of parts as will not depart from the spirit of the invention or scope of the claims hereunto appended.

I claim:

1. An insulator comprising a vitreous body having a head portion, a metal supporting member secured to the exterior surface of the head portion, the head portion provided with an open end cavity, a supporting pin mounted in the cavity and secured therein by interposed cement and radially compressible means surrounding the pin for a distance back from the open end of said cavity, the said means being spaced from the pin over substantially the whole of said distance whereby radial pressure between the said cement and the said means will cause the said means to yield radially.

2. In an insulator comprising a vitreous body provided with a head portion and a metal supporting member secured to the exterior surface of the head portion, the head portion provided with a cavity open at one end and a supporting pin of metal mounted in the cavity and secured to the body by interposed holding material, the combination with the pin of a metal sleeve surrounding the pin for a distance back from the open end of said cavity and holding material interposed between the sleeve and the vitreous body, the sleeve provided with axially extending corrugations spaced circumferentially thereof whereby the radial flexibility of the sleeve is enhanced to prevent damage to the interposed holding material and to the body as a result of pressure between the shell and the cement.

3. In an insulator comprising a vitreous body provided with a head portion and supporting means secured to the head portion, the head portion provided with a cavity open at one end and a metallic supporting pin mounted in the cavity and secured therein by interposed material, the combination with the pin of a sleeve surrounding the pin for a distance back from the open end of said cavity whereby the said material for said distance is held away from the pin and providing an open end space around the pin for said distance, the sleeve being provided with means spaced circumferentially thereof to enhance the radial flexibility thereof whereby damage to the vitreous body is prevented.

4. In an insulator comprising a vitreous body provided with an open end cavity and a metallic supporting pin positioned in the cavity and secured therein by holding material, the combination with said pin of a sleeve having one end secured to the pin and forming a space with said pin and open at the other end and also provided with axially disposed corrugations spaced circumferentially thereof and interlocked with said holding material whereby rotation of the sleeve relative to the holding material is prevented but axial movement of the sleeve relative to the holding material is permitted.

5. In an insulator adapted to support other insulators and comprising a vitreous body provided with an open end cavity and a metallic pin positioned in the cavity and secured therein by holding material, the said pin supporting the suspended load thereon, the combination with the pin of a sleeve positioned in the cavity and surrounding the pin for a predetermined distance away from the said open end, the sleeve mechanically and electrically secured to the pin and forming a space about the pin for said distance and contacting with the oppositely disposed holding material, the sleeve provided with axially disposed means spaced circumferentially of it to interlock with the holding material whereby the sleeve may yield relative to the holding material due to the load on the pin without assuming any of the load.

6. In an insulator adapted to support other insulators and comprising a vitreous body provided with an open end cavity and a metallic pin positioned in the cavity and secured therein by holding material, the said pin supporting the suspended load thereon, the combination with the pin of a sleeve positioned in the cavity and surrounding the pin for a predetermined distance away from the said open end, the sleeve mechanically and electrically secured to the pin and forming a space about the pin for said distance and contacting with the oppositely disposed holding material, the sleeve provided with irregularities lying axially thereof and spaced circumferentially of it to control the radial flexibility of the sleeve whereby the sleeve will yield radially to pressure exerted upon the holding material and sleeve and thereby prevent injury to the vitreous body.

7. An insulator comprising a dielectric member and a metallic load supporting member secured together by interposed material, resilient flanges spaced along a length of the load supporting member to transmit the load on it to the dielectric member through the interposed material and to permit the load supporting member to yield relative to the interposed material under said load, radially yieldable means surrounding the load supporting member for a portion of the length of the load supporting member and secured thereto to move with the load supporting member as it yields under load, the said means provided with axially extending corrugations spaced circumferentially of it to effect the radial yield of said means under radial forces acting thereon to prevent injury to the interposed material and the dielectric member, the said corrugations interlocked with the interposed material whereby rotation of the radially yieldable means relative to the interposed material is prevented without preventing the said means yielding relative to the interposed material.

8. In an insulator comprising a dielectric member and a metallic load supporting member secured together by holding material, the combination with the load supporting member of radially yielding means surrounding the load supporting member for a portion of its length and spaced therefrom and securely contacting the holding material and the load supporting member and subject to radial forces directed toward the axis of the load supporting member, the radial yielding means being so constructed and related to the holding material and the dielectric member that the radial force required to cause the radially yielding means to yield is less than the radial force required to damage the dielectric member.

9. An insulator, comprising a load supporting member having holding means thereon, a dielectric member, holding material interposed between the load supporting member and the dielectric member to secure the members together, a sleeve of metal interposed between the holding material and the load supporting member, the said sleeve spaced from the load supporting member but engaging the holding material, the sleeve being so constructed and related to the load supporting member and to the dielectric member that the sleeve is radially flexible but axially rigid.

10. An insulator, comprising a load supporting member, a dielectric member, holding material interposed between the load supporting member and the dielectric member to secure the members together, the load supporting member comprising a rigid member and a radially compressible sleeve of metal having one end secured to the rigid member and the balance of the sleeve spaced from the rigid member, the said sleeve being interposed between the rigid member and the holding material and provided with an opening into the space between the sleeve and the rigid member.

11. An insulator comprising a dielectric member and a load supporting member and means securing the members together, a radially flexible sleeve formed with a plurality of axially extending means spaced circumferentially of it to control the flexibility of the sleeve, one end of the sleeve being integrally secured to the supporting member and the other end spaced from the supporting member.

12. In an insulator pin comprising a rigid member and means thereon to interlock with holding material to secure the pin to a dielectric member, the combination with the member of a sleeve of relatively thin metal having axially extending corrugations spaced circumferentially of it to effect radial flexibility of the sleeve, one end of the sleeve being secured to the rigid member and the other end of the sleeve being spaced from the rigid member.

13. In an insulator pin comprising a rigid member and having projecting flanges spaced along a portion of the length of the rigid member, the combination with the member of a metallic sleeve of relatively thin material surrounding the rigid member for a portion of the length of the rigid member, means secured to the rigid member and to one end of the sleeve to hold the sleeve in spaced relation to the rigid member, the said space being closed at one end and open at the other end, and a coating of protective metal applied while molten to the aforesaid parts of the pin whereby the parts are rendered resistant to corrosion and the parts united to form a unitary pin.

14. An insulator pin comprising a rigid shank and means on a portion of the shank to interlock with holding material to secure the pin to a dielectric member, a metallic sleeve surrounding a different portion of the shank, means supporting the sleeve in spaced relation to the shank and axially extending irregularities forming a part of the sleeve and spaced circumferentially of it to control the radial flexibility of the sleeve whereby the sleeve will be flexible in a radial direction and rigid in an axial direction.

15. In an insulator pin comprising a rigid shank and means on a portion of the shank to interlock with holding material to secure the pin to a dielectric member, the combination with the shank of a sleeve of relatively thin metal surrounding a portion of the shank adjacent the first said portion and in spaced relation to the shank, the sleeve provided with axially extending means spaced circumferentially of it to control the radial flexibility of the sleeve in the direction of the shank, one end of the sleeve secured to means on the shank to maintain the sleeve in position relative to the shank and to form a sealed joint therewith while the other end of the sleeve remains free of said shank.

16. An insulator pin comprising a rigid shank provided with means on a portion thereof to interlock with holding material to secure the pin to a dielectric member, a sleeve of relatively thin metal surrounding the shank, means to secure the sleeve to the shank and hold it in spaced relation to the shank, a plurality of corrugations forming a part of the sleeve which extend axially thereof and are spaced circumferentially of it to interlock with the holding material to prevent rotation of the sleeve and rigid shank relative to the holding material without preventing axial movement of the sleeve and shank relative to the holding material due to axially loading the pin.

17. An insulator comprising a dielectric member and a load supporting member and holding means securing the members together, a radially flexible sleeve formed with a plurality of axially extending means spaced circumferentially of it to control the flexibility of the sleeve, the sleeve forming a closed space about a portion of the load supporting member and having one end secured to the load supporting member.

18. An insulator comprising a dielectric member and a load supporting member and holding means securing the members together, a radially flexible sleeve provided with means spaced circumferentially of it to control the flexibility of the sleeve, the sleeve forming a closed space around a portion of the load supporting member and having one end integrally secured to the load supporting member at a point spaced from the holding means.

19. An insulator pin comprising a rigid shank and means on a portion of the shank at one end to interlock with holding material to secure the pin to a dielectric member, means at the other end of the shank to make an attachment thereto, a metallic sleeve surrounding a portion of the shank between the said means and forming a space between the sleeve and shank, the end of the sleeve toward the first said means being free to yield radially and the end of the sleeve toward the second said means being integrally secured to the shank.

20. A radially yieldable sleeve for the load supporting pin of an insulator which is strong enough to withstand the radial stress set up in the insulator on corrosion and comprises a shell of relatively thin metal open at both ends, one end for a short distance being circular in cross-section and the balance of the sleeve provided with longitudinally extending means spaced circumferentially thereof to control the flexibility of the said balance of the sleeve to external pressures exerted thereon, the sleeve being free from longitudinal irregularities on its outer surface which would prevent it from yielding axially against surrounding holding material under load.

21. An insulator comprising a body of vitreous insulating material with a cavity in the bottom of the insulating material, means at the top of the insulator by which the insulator is supported, a load-supporting pin with one end secured in the cavity by holding material so as to carry a load, a pin emerging from the holding material within the cavity, a metal element located about the pin at approximately the level of the mouth of the cavity the inner surface of which is there spaced from the shank of the pin, its outer surface being in contact with holding material which connects it with the walls of the cavity, said element being formed with irregularities extending axially thereof and spaced radially with respect to the pin to make it radially resilient, whereby as its outer surface corrodes, any pressure which develops against its outer surface will cause it to yield radially inward.

JOHN J. TAYLOR.

REFERENCES CITED

The following references are of record in the file of this patent:

UNITED STATES PATENTS

| Number | Name | Date |
|---|---|---|
| 1,325,875 | Limont | Dec. 23, 1919 |
| 1,489,690 | Austin | Apr. 8, 1924 |
| 1,489,809 | Austin | Apr. 8, 1924 |
| 1,490,080 | Austin | Apr. 15, 1924 |
| 1,645,447 | Peck | Oct. 11, 1927 |
| 1,653,117 | Peck | Dec. 20, 1927 |
| 1,716,123 | Goddard | June 4, 1929 |

FOREIGN PATENTS

| Number | Country | Date |
|---|---|---|
| 413,808 | France | Aug. 19, 1910 |
| 424,637 | Great Britain | Feb. 22, 1935 |